United States Patent
Nakamura

(10) Patent No.: US 8,041,050 B2
(45) Date of Patent: Oct. 18, 2011

(54) AUDIO DATA REPRODUCTION SYSTEM, AUDIO DATA REPRODUCTION METHOD, AND ELECTRONIC DEVICE USED IN THE SYSTEM

(75) Inventor: Kazuhisa Nakamura, Akiruno (JP)

(73) Assignee: Casio Computer Co., Ltd., Tokyo (JP)

( * ) Notice: Subject to any disclaimer, the term of this patent is extended or adjusted under 35 U.S.C. 154(b) by 488 days.

(21) Appl. No.: 12/339,450

(22) Filed: Dec. 19, 2008

(65) Prior Publication Data
US 2009/0169029 A1    Jul. 2, 2009

(30) Foreign Application Priority Data
Dec. 27, 2007   (JP) .................................. 2007-338115

(51) Int. Cl.
*H04B 3/02*      (2006.01)
*G06F 17/00*     (2006.01)
(52) U.S. Cl. ................................ 381/77; 381/80; 700/94
(58) Field of Classification Search ..................... 381/77; 370/537, 542; 700/94
See application file for complete search history.

(56) References Cited

U.S. PATENT DOCUMENTS
5,953,429 A *   9/1999   Wakai et al. .................... 381/77
2009/0164801 A1   6/2009   Kawahara FOREIGN PATENT DOCUMENTS
JP      7-182112 A        7/1995
JP      2005-114931 A     4/2005
KR      2005-13297 A      2/2005
WO      WO 2007/058292 A1 5/2007

OTHER PUBLICATIONS

Japanese Office Action dated Oct. 27, 2009 and English translation thereof issued in a counterpart Japanese Application No. 2007-338115.
Korean Office Action dated Jul. 30, 2010 and English translation thereof in counterpart Korean Application No. 10-2008-0130985.

* cited by examiner

*Primary Examiner* — Dung A. Le
(74) *Attorney, Agent, or Firm* — Holtz, Holtz, Goodman & Chick, P.C.

(57) ABSTRACT

When a PC (a transmission device) transmits an externally taken-in audio file to an electronic dictionary (a receiving device), the PC encodes the audio file and stores the compressed audio file into its own memory temporarily. On the basis of the file management data created by a file management system when the compressed audio file was stored in the memory, the PC generates a file list for the audio files to be transferred. The file list is encrypted using an encryption key. Then, the encryption key, encrypted file list, and compressed audio file are transmitted to the electronic dictionary. The electronic dictionary stores the encrypted file list and compressed audio file into an SD card and decrypts the encrypted file list using the encryption key. When the decrypted file list corresponds to the compressed audio file, the process of expanding the compressed audio file into an audio file is permitted.

9 Claims, 6 Drawing Sheets

FIG.3

| NUMBER | FILE NAME | TITLE | CREATION DATE AND TIME | FILE SIZE | SPECIFIC ADDRESS DATA |
|---|---|---|---|---|---|
| 1 | AAA.idc | BASIC ENGLISH 1 | 2007.10.19.10.24 | 9601233 | 7F5B46FF |
| 2 | BBB.idc | BASIC ENGLISH 2 | 2007.10.19.10.25 | 19206547 | 12F633BA |
| 3 | CCC.idc | BASIC ENGLISH 3 | 2007.10.19.10.25 | 2345234525 | 8F78BA67 |
| 4 | DDD.idc | BASIC ENGLISH 4 | 2007.10.19.10.25 | 7653673 | 9D5666FF |
| 5 | | | | | |

14L (14LK)

AUDIO DATA REPRODUCTION SYSTEM, AUDIO DATA REPRODUCTION METHOD, AND ELECTRONIC DEVICE USED IN THE SYSTEM

CROSS-REFERENCE TO RELATED APPLICATIONS

This application is based upon and claims the benefit of priority from prior Japanese Patent Application No. 2007-338115, filed Dec. 27, 2007, the entire contents of which are incorporated herein by reference.

BACKGROUND OF THE INVENTION

1. Field of the Invention

This invention relates to an audio data reproduction system and an audio data reproduction method which transfer audio data loaded from an external storage medium, such as compact disc (CD), into a personal computer (PC) to a mobile terminal and reproduce the audio data at the terminal, and an electronic device used in the system.

2. Description of the Related Art

Audio data recorded in an external recording medium, such as a compact disc (CD), is loaded into a personal computer (PC) and the audio data loaded into the PC is further transferred to a mobile terminal, which makes it easy to carry around and reproduce the audio data transferred to the mobile terminal.

When the audio data recorded on the CD has been protected under copyright law, a person who has purchased the CD through the proper channel is permitted to copy the audio data for personal use only. For this reason, if having bought the CD through the proper channel, the user can transfer the audio data from the user's PC to a mobile terminal and use the data.

However, transferring and recording (copying) the audio data loaded into the person's PC to another person's mobile terminal and using the data are regarded as unauthorized use. To overcome this problem, the following method has been considered: a unique encryption key is generated between a device (e.g., PC) on the audio data transmission side and a device (e.g., mobile terminal) on the receiving side, the audio data is encrypted using the encryption key and the encrypted data is transmitted, and the received audio data is decrypted using the encryption key and reproduced, thereby preventing unauthorized use.

In this method, since all of the audio data are to be encrypted, this imposes a heavier burden of encryption on the device on the audio data transmission side and further a heavier burden of decryption on the device on the receiving side. Consequently, both of the devices require sophisticated processors.

To avoid this problem, an audio data reproduction apparatus and an audio data reproduction method have been considered which transmit audio data without encrypting a part of the audio data, thereby alleviating the burden of encryption and decryption as disclosed in Jpn. Pat. Appln. KOKAI Publication No. 2005-114931.

However, in the conventional audio data reproduction apparatus and audio data reproduction method, the audio data still has to be encrypted and decrypted, which makes the burden heavier. For this reason, in an electronic device with a not-so-high performance processor, for example, in an electronic dictionary, it is impossible to take measures to reliably prevent the externally loaded audio data from being used fraudulently.

BRIEF SUMMARY OF THE INVENTION

It is an object of the invention to provide an audio data reproduction system which is capable of preventing fraudulent use of audio data reliably even if having a not-so-high performance processor as, for example, an electronic dictionary.

According to an aspect of the invention, there is provided an audio data reproduction system which transmits an audio file taken in from a transmission-side device to a receiving-side device and reproduces the audio file received by the receiving-side device, the transmission-side device comprising: first storage means for storing audio files; file encoding means for encoding the audio files stored in the first storage means by a specific encoding method; list generation means for generating a file list of the audio files encoded by the file encoding means; list encryption means for encrypting the file list generated by the list generation means; and file transmission means for transmitting the file list encrypted by the list encryption means and the audio files encoded by the file encoding means to the receiving-side device, and the receiving-side device comprising: file receiving means for receiving the encrypted file list and encoded audio files transmitted from the transmission-side device; second storage means for storing the encrypted file list and encoded audio files received by the file receiving means; file decryption means for decrypting the encrypted file list stored in the second storage means; list determining means for determining whether the file list decrypted by the file decryption means corresponds to the encoded audio files stored in the second storage means; and file reproduction means for, if the list determining means has determined that the decrypted file list corresponds to the encoded audio files, expanding and reproducing the encoded audio files.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 shows the contents of an audio file list 14L generated by the audio data reproduction method in the audio data reproduction system;

DETAILED DESCRIPTION OF THE INVENTION

Hereinafter, referring to the accompanying drawings, an embodiment of the invention will be explained.

Figure 1:
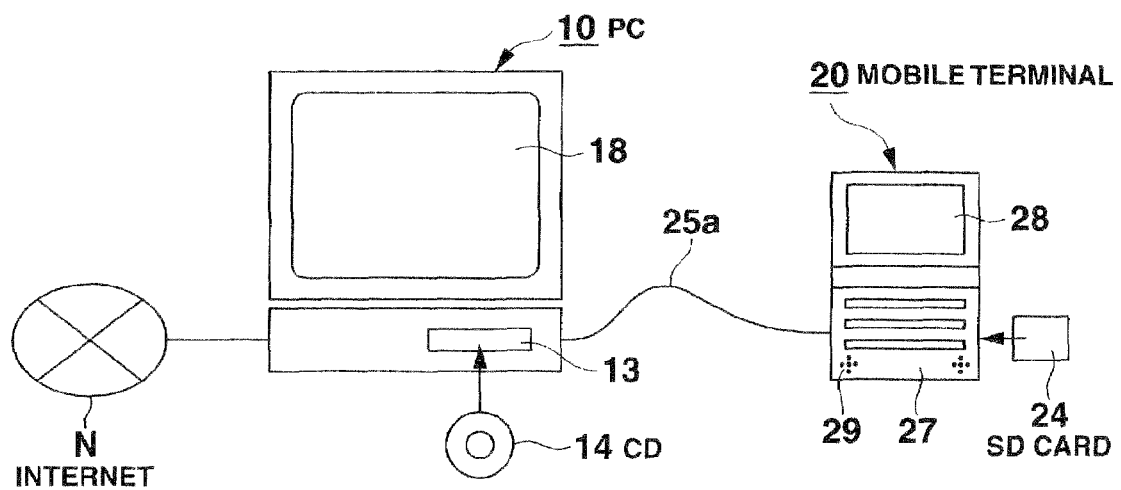
FIG. 1 shows an appearance configuration of an audio data reproduction system according to an embodiment of the invention.

FIG. 1 shows the configuration of an audio data reproduction system according to an embodiment of the invention.

The audio data reproduction system comprises a personal computer (PC) 10 which functions as an audio data transmission device and a mobile terminal (electronic dictionary) 20 which functions as an audio data receiving terminal. The PC 10 is connected to the Internet N. The electronic dictionary 20 is connected to the PC 20 via a USB cable 25a.

In the audio data reproduction system, for example, language education audio data recorded on a CD (external storage medium) 14 is read by an external disk reading unit 13, which then compresses (encodes) the audio data and then transmits the compressed data to the electronic dictionary 20. Alternatively, for example, language education audio data downloaded from an audio data delivery server on the Internal is compressed (or encoded) and the compressed data is transmitted to the electronic dictionary 20.

The compressed (or encoded) audio data received by the electronic dictionary 20 is recorded into an SD memory (memory card) 24 and then expanded (or decoded). The expanded data is reproduced by a speaker (audio output means) 29.

Figure 2:
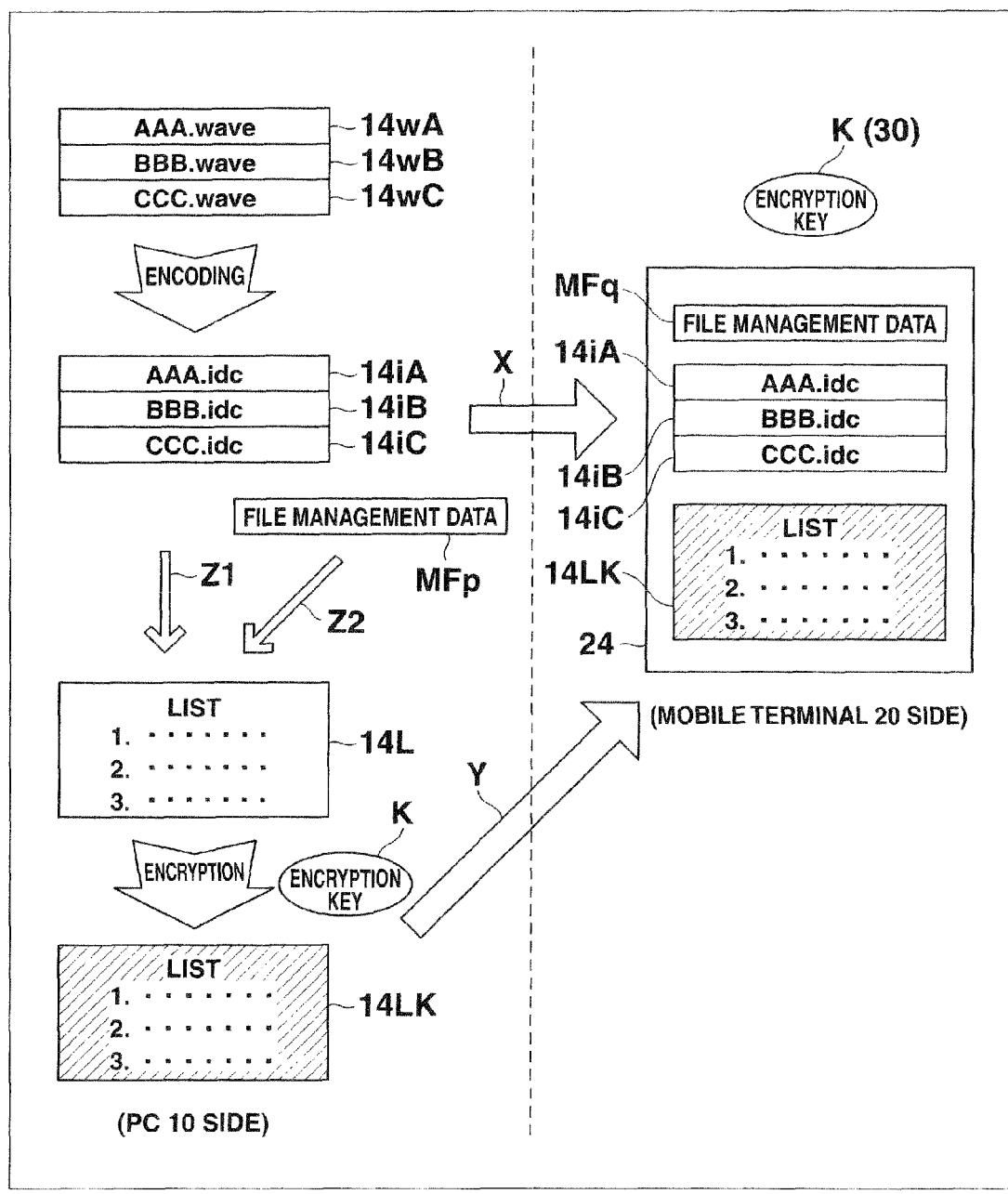
FIG. 2 is a diagram to help outline an audio data reproduction method in the audio data reproduction system.

At this time, an audio file is processed by an audio data reproduction method as shown in FIG. 2, thereby preventing the audio data from being used fraudulently.

FIG. 2 is a diagram to help outline the audio data reproduction method in the audio data reproduction system.

The PC 10 converts, for example, language education audio data items A, B, C, . . . taken in from the CD 14 (or the Internet N) into, for example, WAV files, such as audio files (AAA.wave) 14wA, (BBB.wave) 14wB, (CCC.wave) 14wC, . . . , and records these files into a memory. Thereafter, these audio files are encoded by a specific compression method into compressed audio files (AAA.idc) 14iA, (BBB.idc) 14iB, (CCC.idc) 14iC, . . . .

At this time, when the PC 10 stores the compressed audio files into the memory, a file management system in the PC 10 creates file management data MFp for each of the compressed audio files. If the OS of the PC 10 is Windows®, FAT (File Allocation Table) data is created as file management data for the compressed audio files.

In the file management data MFp created by the file management system, "File name," "File creation date and time," "File size," "File storage location," and others are written as entry information for each of the compressed audio files (AAA.idc) 14iA, (BBB.idc) 14iB, (CCC.idc) 14iC, . . . .

Then, in the PC 10, an audio file list 14L used in reproducing the audio files is generated on the basis of the compressed audio files.

FIG. 3 shows the contents of the audio file list 14L generated by the PC 10 in the audio data reproduction system.

In the audio file list 14L, "File name," "File creation date and time," and "File size" read from the file management data MFp are written as shown by arrows Z1, Z2 of FIG. 2 for each of the compressed audio files. Moreover, "Title" retrieved at an audio-music information retrieval server on the Internet as a result of taking in data from the CD 14 (or the Internet N) and "Specific address data" (e.g., 10 bytes of compressed audio data from the start of the data) are written in the audio file list 14L.

The audio file list 14L generated in this way is encrypted using a unique encryption key K generated on the basis of a combination of the PC 10 and electronic dictionary 20, thereby producing an encrypted audio file list 14LK.

Then, the encryption key K and encrypted audio file list 14LK are transferred together with the compressed audio files to the electronic dictionary 20 as shown by arrows X, Y.

In the electronic dictionary 20, the file management system of the electronic dictionary 20 stores the compressed audio file and encrypted audio file list 14LK received from the PC 10 into the SD card® (external storage medium) 24. At this time, the file management system of the electronic dictionary 20 generates file management data MFq and stores the data MFq into the SD card® (external storage medium) 24.

At this time, "File name," "File creation date and time," and "File size" written in the file management data MFp created on the PC 10 are handed over from the file management system of the PC 10 to that of the electronic dictionary 20 and are written into the file management data MFq of the electronic dictionary 20.

The encryption key K received from the PC 10 is stored into a NAND flash memory 30 incorporated in the body of the terminal.

To reproduce the compressed audio files stored in the electronic dictionary 20, first, the encrypted audio file list 14LK is decrypted using the encryption key K, thereby producing an audio file list 14L.

Then, after it has been determined that "File name," "File creation date and time," "File size," and "Specific address data" corresponding to each of the compressed audio files in the decrypted audio file list 14L coincide with "File name," "File creation date and time," "File size," and "Specific address data" in each of the compressed audio files written in the file management data MFq, each of the compressed audio files can be expanded and reproduced.

This makes it impossible to expand and reproduce the compressed audio files in the SD card® 24 even if, for example, the SD card® 24 of the electronic dictionary is inserted into another electronic dictionary 20 or is copied and inserted into another electronic dictionary, unless the encrypted audio file list 14LK is decrypted using the encryption key K generated between the PC 10 and electronic dictionary 20. Then, the encrypted data decryption process on the electronic dictionary 20 is limited only to the process of decrypting the encrypted audio file list 14LK. Therefore, although having only a not-so-high performance processor, the electronic dictionary 20 can prevent the compressed audio files transferred from the PC 10 from being used fraudulently.

Figure 4:
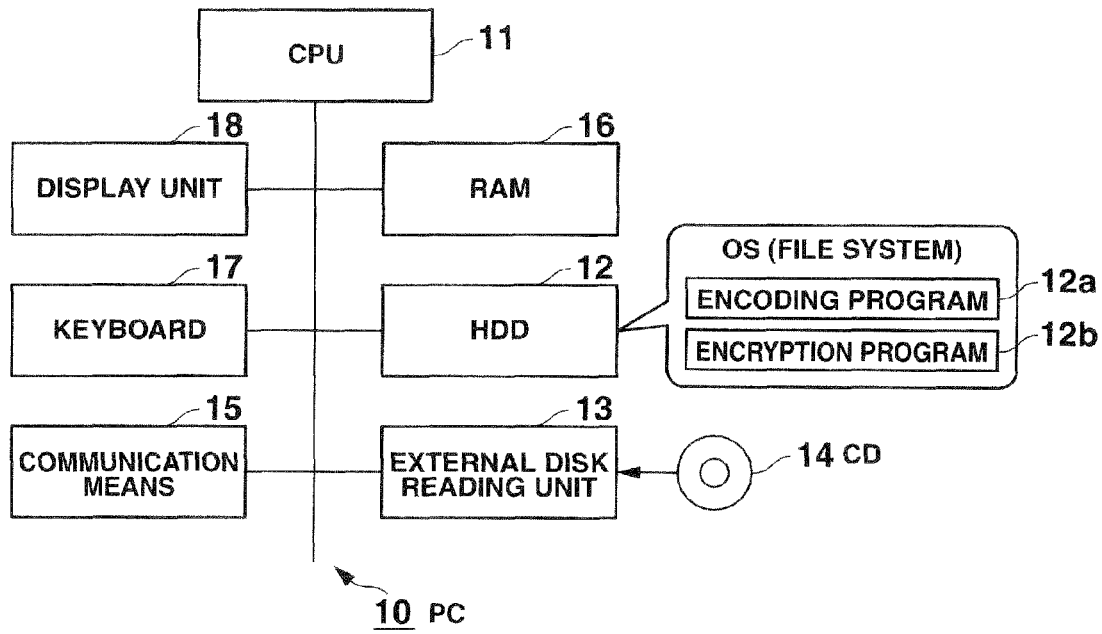
FIG. 4 is a block diagram showing the configuration of the electronic circuitry of a personal computer (PC) 10 in the audio data reproduction system.

FIG. 4 is a block diagram showing a configuration of the electronic circuitry of the personal computer (PC) 10 in the audio data reproduction system.

The PC 10 includes a CPU (processor) 11.

The CPU 11 controls the operations of various sections of the circuitry using a RAM 16 as a working memory according to a system program OS previously stored in an HDD (Hard Disc Drive) 12, a PC control program stored in the HDD 12 via an external disk reading unit 13 from an external storage medium 14, such as a CD-ROM, or a PC control program stored in the HDD 12 via communication means 15 from an external communication network (Internet N).

Connected to the CPU 11 are not only the HDD 12, external disk reading unit 13, communication means 15, and RAM 16 but also a keyboard 17 and a display unit 18.

The system program OS and PC control program stored in the HDD 12 include a communication control program, a document processing program, an image processing program, an audio processing program, and a file management program. In addition to these, an encoding program for compressing various types of data files created and managed according to the file management program and an encryption program for encrypting files are stored.

Then, these system program OS and PC control programs are activated by the CPU 11 according to a key input signal corresponding to a use operation on the keyboard 17, an input signal from an external unit received by the communication means 15, or an operation signal from the external disk reading unit 13.

Figure 5:
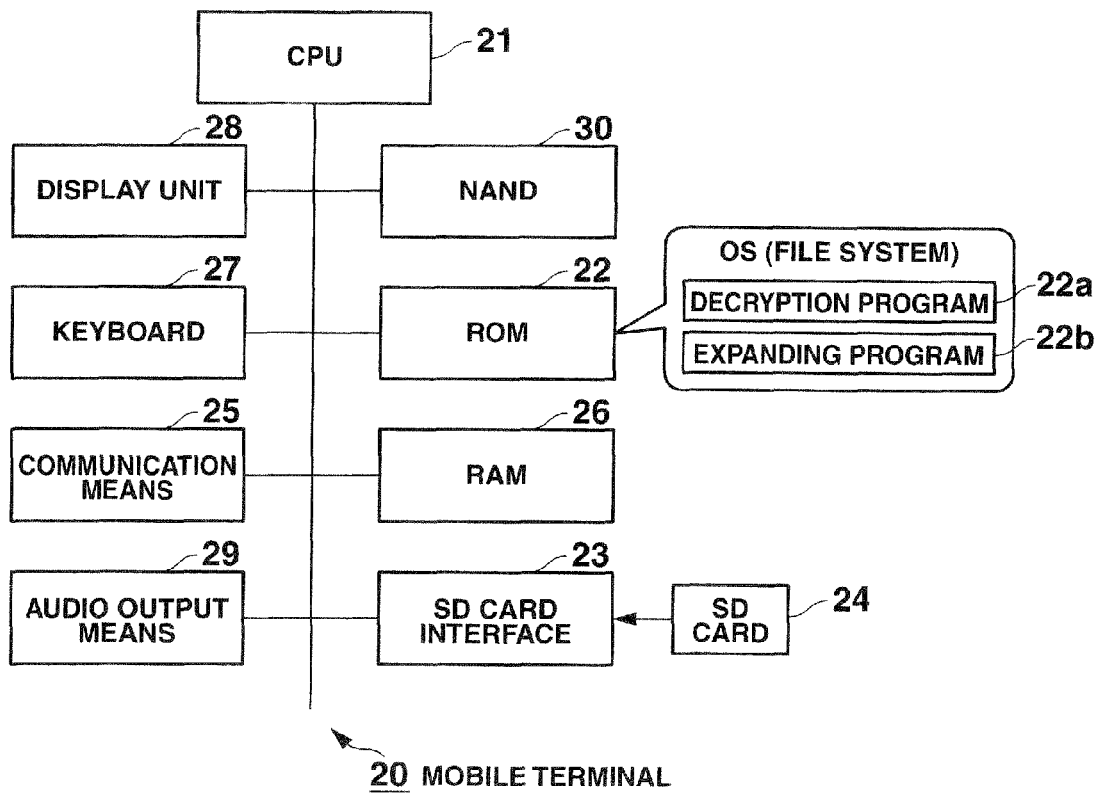
FIG. 5 is a block diagram showing the configuration of the electronic circuit of a mobile terminal (electronic dictionary) 20 in the audio data reproduction system.

FIG. 5 is a block diagram showing a configuration of the electronic circuit of a mobile terminal (electronic dictionary) 20 in the audio data reproduction system.

The electronic dictionary 20 includes a CPU (processor) 21 acting as a computer.

The CPU 21 of the electronic dictionary 20 need not have as high a performance as the CPU 11 of the PC 10.

The CPU 21 controls various sections of the circuit using a RAM 16 as a working memory according to a system program OS or an electronic dictionary control program previously stored in a ROM 22.

Connected to the CPU 21 are not only the ROM 22, an SD card interface 23, communication means 25, and a RAM 26 but also a keyboard 27, a display unit 28, audio output means 29, and a NAND flash memory 30.

The system program OS and electronic dictionary control programs stored in the ROM 22 include a dictionary retrieval program, a communication control program, an audio processing program, and a file management program. In addition, an expansion program for expanding compressed data files managed by the file management program and a decryption program for decrypting encrypted data are stored in the ROM 22. Moreover, various dictionary data items, including an English-Japanese dictionary, a Japanese-English dictionary, a Japanese-language dictionary, and a Kanji dictionary, are stored in the ROM 22.

Then, these system program OS and electronic dictionary control programs are activated by the CPU 21 according to a key input signal corresponding to a user operation on the keyboard 27, an input signal from an external unit received by the communication means 25, or an operation signal from the SD card interface 23.

Next, an audio data reproduction function carried out by the PC 10 and electronic dictionary 20 in the audio data reproduction system configured as described above will be explained.

Figure 6:
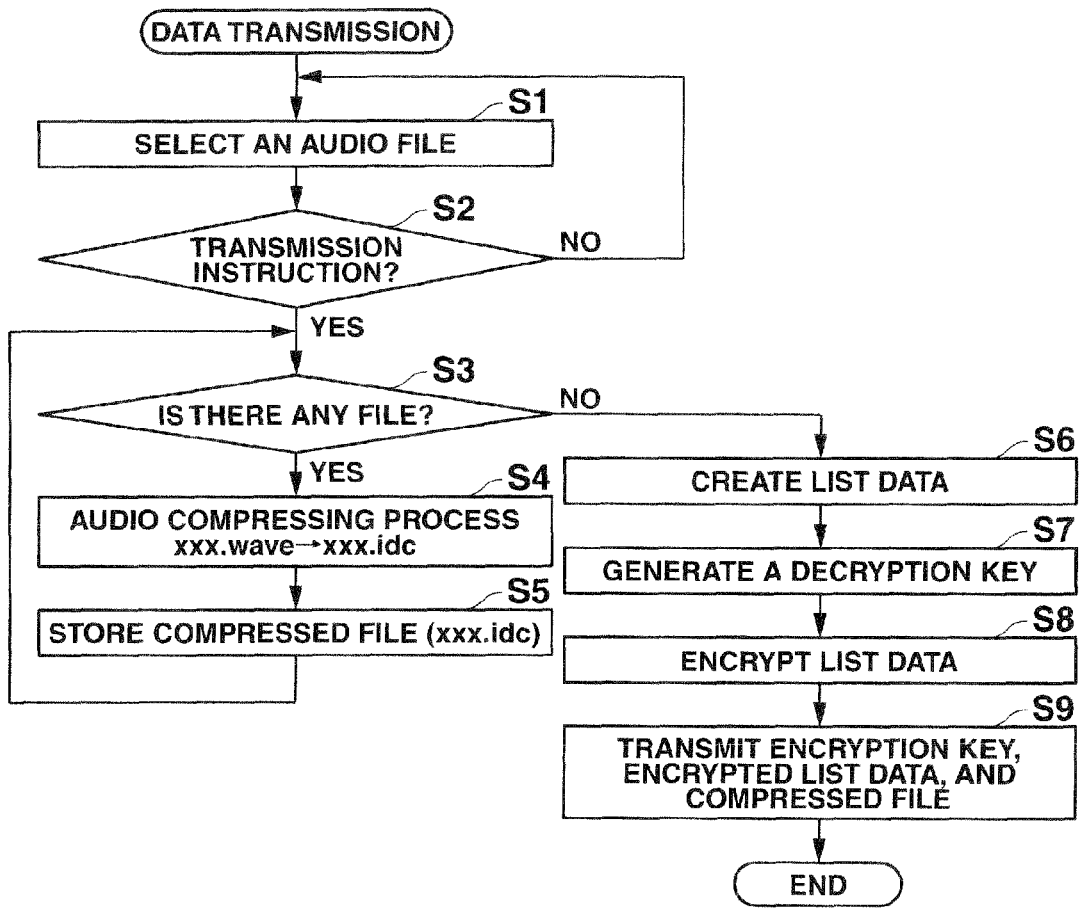
FIG. 6 is a flowchart to help explain a data transmission process on a PC 10 in the audio data reproduction system.

FIG. 6 is a flowchart to help explain a data transmission process on the PC 10 in the audio data reproduction system.

In the PC 10, first, audio data is read from the CD 14 via the external disk reading unit 13, or from an audio delivery server on the Internet N via the communication means 15. For example, if English conversation material audio data items A, B, C, . . . have been read in, these audio data items are converted into WAV files, such as audio files (AAA.wave) 14wA, (BBB.wave) 14wB, (CCC.wave) 14wC, . . . , which are then stored in the HDD 12. At this time, an audio/music information retrieval server is accessed and "Title" corresponding to the audio files (AAA.wave) 14wA, (BBB.wave) 14wB, (CCC.wave) 14wC, . . . is retrieved and stored together with the audio files 14wA, 14wB, 14wC, . . . into the HDD 12.

Then, when the audio files stored in the HDD 12 are transmitted to the electronic dictionary 20, a list of audio files stored in the HDD 12 is displayed on the display unit 18 and a desired audio file to be reproduced on the electronic dictionary 20 is selected according to a user operation (step S1). For example, when audio files (AAA.wave) 14wA, (BBB.wave) 14wB, (CCC.wave) 14wC, . . . are selected (step S1) and a transmission instruction is given by the user (Yes in step S2), the selected audio files 14wA, 14wB, 14wC, . . . are encoded into compressed audio files (AAA.idc) 14iA, (BBB.idc) 14iB, (CCC.idc) 14iC, . . . according to a specific encoding program 12a, respectively as shown in FIG. 2, (step S3→step S4) and stored into the HDD 12 sequentially (step S5).

At this time, the file management system of the PC 10 creates file management data MFp for the compressed audio files 14iA, 14iB, 14iC, . . . . The file management data MEFp is also stored in the HDD 12.

The specific encoding method (12a) in the PC 10 is an unpublicized method and corresponds to a specific expansion method (22b) in the electronic dictionary 20.

When compressed audio files corresponding to all the selected audio files have been created and stored in the HDD 12 according to the processes in step S3 to step S5 (No in step S3), an audio file list 14L corresponding to the compressed audio files is generated as shown in FIGS. 2 and 3 (step S6).

Then, a unique encryption key K is generated only between the PC 10 and electronic dictionary 20 (step S7). The encryption key K is generated using a unique number or symbol, such as a mutually authenticated device ID, as a result of, for example, connecting with the electronic dictionary 20 via the USB cable 25a. Not only may the encryption key K be generated each time the PC 10 is connected to the electronic dictionary 20, but also the encryption key K generated as a result of the first connection may be stored and the same key be used in the subsequent processes.

Then, the audio file list 14L generated in step S6 is encrypted using the encryption key K generated in step S7, thereby producing an encrypted audio file list 14LK as shown in FIG. 2 (step S8).

Then, the compressed audio files stored in the HDD 12 in step S5 are transmitted together with the encryption key K generated in step S7 and the encrypted audio file list 14LK encrypted in step S8 to the electronic dictionary 20 via the communication means 15.

Figure 7:
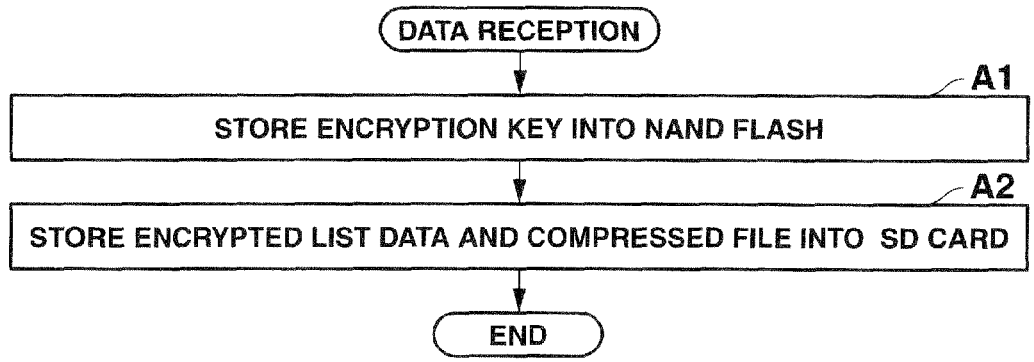
FIG. 7 is a flowchart to help explain a data receiving process in the electronic dictionary 20 in the audio data reproduction system.

FIG. 7 is a flowchart to help explain a data receiving process in the electronic dictionary 20 in the audio data reproduction system.

When the electronic dictionary 20 has received a plurality of compressed audio files transmitted from the PC 10, the encryption key K, and the encrypted audio file list 14LK via the communication means 25, the encryption key K is stored as a decryption key into the NAND flash memory 30 as shown in FIG. 2 (step A1).

Furthermore, the file management system of the electronic dictionary 20 stores the received encrypted audio file list 14LK and compressed audio files into the SD card® (external storage medium) 24 (step A2). At this time, the file management system of the electronic dictionary 20 creates file management data MFq. "File name," "File creation date and time," and "File size" written in the file management data MFp created on the PC 10 are handed over to the file management system of the electronic dictionary 20 and are written into the file management data MFq of the electronic dictionary 20.

Figure 8:
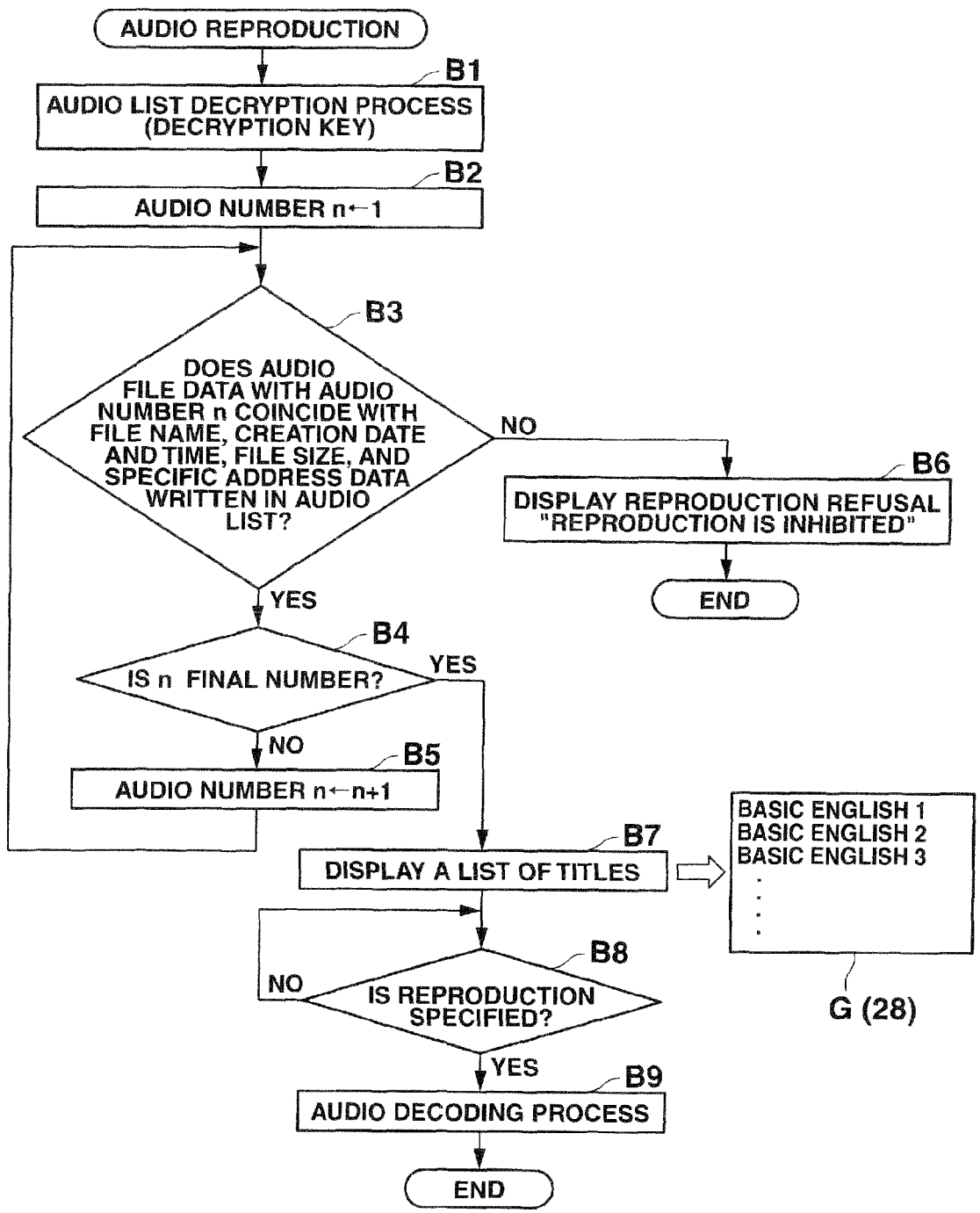
FIG. 8 is a flowchart to help explain an audio reproduction process in the electronic dictionary 20 in the audio data reproduction system.

FIG. 8 is a flowchart to help explain an audio reproduction process in the electronic dictionary 20 in the audio data reproduction system.

When the process of reproducing the compressed audio files stored in the SD card® 24 is specified, first, the encrypted audio file list 14LK (see FIG. 3) stored in the SD card® 24 is decrypted using the encryption key (decryption key) K stored in the NAND flash memory 30 according to a decryption program 22a in the ROM 22 and is converted into an audio file list 14L (step B1).

Then, a list data item whose audio number "1" in the encrypted audio file list 14L is specified (step B2). Then, it is determined whether "File name" (AAA.idc), "File creation date and time" (2007.10.19.10.24), "File size" (9601233), and "Specific address data" (7F5B46FF) written as list data items corresponding to audio number "1" coincide with the corresponding "File name," "File creation date and time," and "File size" written in the file management data MFq and "Specific address data" in the first compressed audio file (AAA.idc) 14iA stored in the SD card® 24 (step B3).

Here, if it has been determined that the list data for audio number "1" in the decrypted audio file list 14L coincides with the first file management information and the actual data in a specific part managed in the file management data MFq (Yes in step B3), it is determined whether audio number n of the encrypted audio file list 14L now being specified has reached the final number (step B4).

Then, if it has been determined that the audio number n of the encrypted audio file list 14L now being specified has not reached the final number (No in step B4), an audio number n(=n+1) next to the audio file list 14L is specified (step B5).

Then, similarly, it is determined whether "File name" (BBB.idc), "File creation date and time" (2007.10.19.10.25), "File size" (19206547), and "Specific address data" (12F633BA) written as list data items corresponding to next audio number "2" coincide with the corresponding "File name," "File creation date and time," and "File size" written in the file management data MFq and "Specific address data" in the second compressed audio file (BBB.idc) 14iB stored in the SD card® 24 (step B3).

In the process of determining whether the list data items with audio numbers 1, 2, . . . in the decrypted audio file list 14L coincide with the corresponding file management information items and the actual data items in the corresponding parts managed in the file management data MFq (step B3 to step B5), if it has been determined that the list data in the audio file list 14L does not coincide with the file management information and the actual data (e.g., 10 bytes of compressed audio data from the start of the data) in the specific parts managed in the file management data MFq (No in step B3), the audio reproduction refusal message "Reproduction is inhibited" is displayed on the display unit 28, thereby informing the user (step B6).

If it has been determined that all the list data items in the audio file list 14L coincide with the corresponding file management information and the actual data in the specific parts managed in the file management data MFq (Yes step B3→step B4), titles "Basic English 1," "Basic English 2,". . . in the list data items written in the audio file list 14L are read and displayed as an title list screen G on the display unit 28 (step B7).

With the title list screen G being displayed, when a desired title (e.g., "Basic English 1") is selected according to a user operation and its reproduction is specified (Yes in Step B8), the compressed audio file (AAA.idc) 14iA of the title "Basic English 1" whose reproduction has been specified is read from the SD card® 24 and expanded (decoded) according to the expansion program 22b stored in the ROM 22 (step B9). Then, the audio file (AAA.wave) 14wA of the expanded "Basic English 1" is reproduced according to the audio processing program in the ROM 22. The reproduced audio is output from the audio output means 29.

This makes it impossible to expand and reproduce the compressed audio files in the SD card® 24 even if, for example, the SD card® 24 of the electronic dictionary 20 is inserted into another electronic dictionary or is copied and inserted into another electronic dictionary, unless the encrypted audio file list 14LK is decrypted using the encryption key K generated between the PC 10 and electronic dictionary 20. Then, the encrypted data decryption process on the electronic dictionary 20 is limited only to the process of decrypting the encrypted audio file list 14LK. Therefore, although having only a not-so-high performance processor, the electronic dictionary 20 can prevent the compressed audio files transferred from the PC 10 from being used fraudulently.

The processing methods carried out by the PC 10 of the audio data reproduction system and the electronic dictionary 20 described in the embodiment, that is, the process of transmitting data from the PC 10 to the electronic dictionary 20 shown in the flowchart of FIG. 6, the process of the electronic dictionary 20 receiving data from the PC 10 shown in the flowchart of FIG. 7, the process of reproducing audio at the electronic dictionary 20 shown in the flowchart of FIG. 8, and others, may be stored into memory cards (e.g., SD cards®, ROM cards, or RAM cards), magnetic disks (e.g., floppy disks or hard disks), optical disks (e.g., CD-ROMs or DVDs), semiconductor memories, or the like in the form of computer-executable programs. Then, these cards, disks, memories, or the like may be distributed. The computers (11), (22) of the PC 10 and electronic dictionary 20 read in the program stored in the external recording medium. The read-in program controls the operation so as to realize the data reproduction function of the PC 10 and that of the electronic dictionary 20 explained in the embodiment, which makes it possible to execute the same processes by the above-described methods.

Furthermore, the data of the program to realize each of the above methods can be transferred in the form of program codes over a communication network (e.g., the Internet N). The program data is loaded from a computer unit (or a program server) connected to the communication network N into storage units (12), (22) via communication interfaces (15), (25), thereby realizing the audio data reproduction function of the PC 10 and that of the electronic dictionary 20.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An audio data reproduction system which transmits an audio file taken in from a transmission-side device to a receiving-side device and reproduces the audio file received by the receiving-side device,
the transmission-side device comprising:
first storage means for storing audio files;
file encoding means for encoding the audio files stored in the first storage means by a specific encoding method;
list generation means for generating a file list of the audio files encoded by the file encoding means;
list encryption means for encrypting the file list generated by the list generation means; and
file transmission means for transmitting the file list encrypted by the list encryption means and the audio files encoded by the file encoding means to the receiving-side device, and the receiving-side device comprising:
file receiving means for receiving the encrypted file list and encoded audio files transmitted from the transmission-side device;
second storage means for storing the encrypted file list and encoded audio files received by the file receiving means;
file decryption means for decrypting the encrypted file list stored in the second storage means;
list determining means for determining whether the file list decrypted by the file decryption means corresponds to the encoded audio files stored in the second storage means; and
file reproduction means for, if the list determining means has determined that the decrypted file list corresponds to the encoded audio files, expanding and reproducing the encoded audio files.

2. The audio data reproduction system according to claim 1, wherein the list generation means generates the data in the file list in such a manner that the data includes a part of file management data in the audio files generated by a file management system of the transmission-side device, and
the list determining means determines whether the file management data included in the file list decrypted by the file decryption means coincides with the file management data in the encoded audio files generated by the file management system of the receiving-side device.

3. The audio data reproduction system according to claim 2, wherein the file management data includes at least any one of the following management data items: the file creation date and time of and the file size of the audio files.

4. The audio data reproduction system according to claim 2, wherein the file management data includes the data in a specific address of the audio file encoded by the file encoding means.

5. An audio data reproduction method of transmitting an audio file taken in from a transmission-side device to a receiving-side device and reproducing the audio file received by the receiving-side device,
the transmission-side device carrying out:
a file encoding step of encoding the audio files stored in a memory by a specific encoding method;
a list generation step of generating a file list of the audio files encoded in the file encoding step;
a list encryption step of encrypting the file list generated in the list generation step; and
a file transmission step of transmitting the file list encrypted in the list encryption step and the audio files encoded in the file encoding step to the receiving-side device, and
the receiving-side device carrying out:
a file receiving step of receiving the encrypted file list and encoded audio files transmitted from the transmission-side device;
a file storage step of storing in a memory the encrypted file list and encoded audio files received in the file receiving step;
a file decryption step of decrypting the encrypted file list stored in the memory in the file storage step;
a list determining step of determining whether the file list decrypted in the file decryption step corresponds to the encoded audio files stored in the memory in the file storage step; and
a file reproduction step of, if it has been determined in the list determining step that the decrypted file list corresponds to the encoded audio files, expanding and reproducing the encoded audio files.

6. The audio data reproduction method according to claim 5, wherein the list generation step generates the data in the file list in such a manner that the data includes a part of file management data in the audio files generated by a file management system of the transmission-side device,
the list determining step determines whether the file management data included in the file list decrypted in the file decryption step coincides with the file management data in the encoded audio files generated by the file management system of the receiving-side device.

7. The audio data reproduction method according to claim 6, wherein the file management data includes at least any one of the following management data items: the file creation date and time of and the file size of the audio files.

8. The audio data reproduction method according to claim 6, wherein the file management data includes the data in a specific address of the audio file encoded in the file encoding step.

9. An audio data receiving terminal which receives an audio file encoded by a transmission-side device and an encrypted file list for the audio file and reproduces the received audio file, the audio data receiving terminal comprising:
file receiving means for receiving the encrypted file list and encoded audio files transmitted from the transmission-side device;
file storage means for storing the encrypted file list and encoded audio files received by the file receiving means;
file decryption means for decrypting the encrypted file list stored in the file storage means;
list determining means for determining whether the file list decrypted by the file decryption means corresponds to the encoded audio files stored in the file storage means; and
file reproduction means for, if the list determining means has determined that the decrypted file list corresponds to the encoded audio files, expanding and reproducing the encoded audio files.

* * * * *